United States Patent [19]
Simon et al.

[11] Patent Number: 5,358,210
[45] Date of Patent: Oct. 25, 1994

[54] DEVICE FOR FILTERING VIBRATION, AND A FIXING SYSTEM COMPRISING A PLURALITY OF SUCH DEVICES FOR FIXING A LOAD ON A SUPPORT

[75] Inventors: Jean-Michel Simon, Clamart; Jean-Pierre Ciolczyk, Chalette sur Loing, both of France

[73] Assignee: Hutchinson, Paris, France

[21] Appl. No.: 39,857

[22] Filed: Mar. 30, 1993

[30] Foreign Application Priority Data
Mar. 31, 1992 [FR] France ................... 92 03873

[51] Int. Cl.⁵ ............................................. F16M 13/00
[52] U.S. Cl. ..................................... 248/628; 267/30; 267/41; 248/621; 248/630
[58] Field of Search ............... 248/628, 626, 618, 621, 248/638, 603, 604, 630; 267/44, 41, 47, 269, 260, 30

[56] References Cited

U.S. PATENT DOCUMENTS

| | | | |
|---|---|---|---|
| 2,546,268 | 3/1951 | Leeris | 248/626 |
| 4,313,620 | 2/1982 | Posnikoff | 267/44 X |
| 5,042,783 | 8/1991 | Ciolczyk et al. | 248/628 X |
| 5,102,107 | 4/1992 | Simon et al. | 248/621 X |
| 5,217,198 | 6/1993 | Samarov et al. | 248/628 X |

FOREIGN PATENT DOCUMENTS

| | | |
|---|---|---|
| 132048 | 1/1985 | European Pat. Off. . |
| 296974 | 12/1988 | European Pat. Off. . |
| 351738 | 1/1990 | European Pat. Off. . |

OTHER PUBLICATIONS

NASA Tech Brief, "Composite Struts Would Damp Vibrations", NTIS Tech Notes, Sep. 1991, Springfield, Va., p. 718.
Patent Abstracts of Japan, vol. 9, No. 282 (M-428) (2005), Nov. 9, 1985, JP-A-60 125 427, Jul. 4, 1985.

*Primary Examiner*—Ramon O. Ramirez
*Attorney, Agent, or Firm*—Bell, Seltzer, Park & Gibson

[57] ABSTRACT

The invention relates to a vibration-filtering device and to a system for fixing a load on a support by means of a plurality of such devices.

The device of the invention for fixing a load on a support comprises:
a first fastening zone including fastening means for fastening the device to a support;
an arcuate zone;
a beam substantially parallel to the first fastening zone;
a second fastening zone including fastening means for fastening a load to the device; and
at least two spring blades interconnected by an elastomer layer extending through the first fastening zone and the arcuate zone; wherein:
the device is a vibration-filtering device;
the spring blades interconnected by an elastomer layer pass through the beam to terminate in the second fastening zone close to the fastening means but separated therefrom by respective elastomer layers, in that the spring blades are separated from one another in the first fastening zone for fastening the fastening means on a support by an elastomer layer; and
the layer interconnecting the spring blades includes an elastomer having a high damping coefficient, in particular butyl rubber, in particular in the arcuate zone.

13 Claims, 3 Drawing Sheets

DEVICE FOR FILTERING VIBRATION, AND A FIXING SYSTEM COMPRISING A PLURALITY OF SUCH DEVICES FOR FIXING A LOAD ON A SUPPORT

The present invention relates mainly to a device for filtering vibration, and to a fixing system comprising a plurality of such devices for fixing a lead on a support.

BACKGROUND OF THE INVENTION

Patent EP-0 296 974, in the name of the Applicant describes resilient supports providing a large amount of clearance for protecting electronic equipment from shock, in particular in the event of a collision or of an explosion. In a variant embodiment described in that patent, the support includes an elastomer arm having a plurality of cables of composite material embedded therein and extended along one side by fastening means that form circular or elliptical arcs including two spring blades of composite material connected together by a layer of elastomer. The elastomer arm including composite cables is connected to the circular or elliptical arc-forming fastening device by a transition zone enabling thickness and width to vary continuously. The arm made of natural rubber which has a low damping coefficient is thicker and narrower than the fastening device which is made of an elastomer that has a high damping coefficient.

The resilient support of patent EP-0 296 974 does not provide effective filtering of vibration, particularly vibration at a frequency lying in the range 10 Hz to 800 Hz. The bottom spring blade is directly secured to a metal fixing support which enhances vibration propagation.

At no moment does that document describe damping vibration by shear in the layer of elastomer lying between the two spring blades made of composite material. On the contrary, the assembly constituted by the spring blades and the intermediate elastomer layer is referred to in column 14, line 39, as "a matrix-fixing composite spring". Furthermore, in column 14, lines 4 to 6, the possibility is suggested of implementing a fixing device that includes a central layer of composite material with two extreme layers of elastomer. In that variant embodiment, the shear required for damping vibration is not achieved.

Also, the blade springs extend within the resilient support of patent EP-0 296 974 only as far as the transition zone between the arms and the fastening means that form a circular arc, and that does not provide the stiffness and resonant frequency characteristics suitable for filtering vibration.

U.S. Pat. No. 4,942,075 describes a spring comprising two oval blades between which a layer of rubber is interposed. In FIG. 4 of that patent, there can be seen an embodiment in which the layer of rubber does not extend in the arcuate zones.

EP-A-0 132 048 describes a spring having mutually parallel blades between which a layer of elastomer is interposed for damping purposes. The embodiment shown in FIG. 11 of that document includes an outer layer 32 of elastomer which does not contribute to damping vibration.

Those patents do not disclose, nor do they suggest, implementing shear forces within rubber for the purpose of damping vibration.

OBJECTS AND SUMMARY OF THE INVENTION

In the light of the above prior art, the present invention seeks to provide a vibration-filtering device that is particularly effective.

Another object of the invention is to provide a vibration-filtering device suitable for working over a wide range of frequencies.

Another object of the present invention is to provide a vibration-filtering device that retains its properties under a heavy load.

Another object of the present invention is to offer a device that is compact, occupying little bulk.

Finally, another object of the present invention is to provide a system for fastening an apparatus (in particular a rotary machine of considerable mass) on the support, the device providing vibration-filtering between the platform of the apparatus and the support.

The present invention provides a device for fixing a load on a support, the device comprising in succession:

a first fastening zone including fastening means for fastening the device to a support;

an arcuate zone;

a beam substantially parallel to the first fastening zone;

a second fastening zone including fastening means for fastening a load to the device; and at least two spring blades interconnected by an elastomer layer extending through the first fastening zone and the arcuate zone; wherein:

the device is a vibration-filtering device;

the spring blades interconnected by an elastomer layer pass through the beam to terminate in the second fastening zone close to the fastening means but separated therefrom by respective elastomer layers, in that the spring blades are separated from one another in the first fastening zone for fastening the fastening means on a support by an elastomer layer; and the layer interconnecting the spring blades includes an elastomer having a high damping coefficient, in particular butyl rubber, in particular in the arcuate zone.

The invention also provides a device wherein the spring blades are composite material springs.

The invention also provides a device wherein the layer interconnecting the spring blades includes an elastomer having a low damping coefficient, in particular natural rubber, in particular in the beam.

The invention also provides a device including a transition zone between the arcuate zone and the beam, the thickness of the beam being greater than the thickness of the arcuate zone of the device.

The invention also provides a device including a transition zone between the arcuate zone and the beam which is narrower than the arcuate zone of the device.

The invention also provides a device including a mass fixed substantially halfway along the arcuate zone to modify the dynamic behavior of the device.

The invention also provides a device including at least three spring blades interconnected in pairs by elastomer layers.

The invention also provides a device, wherein the elastomer layer in the first fastening zone and interconnecting the springs and the fastening means is substantially in the form of a rectangular parallelepiped.

The invention also provides a device, wherein the fastening means for fastening a load to the device comprise a comb having the ends of the spring blades penetrating between the teeth of the comb.

The invention also provides a device, wherein the second fastening zone includes elastomer overmolding on the first and last teeth of the comb formed by the ends of the fastening means.

The invention also provides a device that is generally C-shaped.

The invention also provides a system for fastening a load on a support, and in particular for fastening a rotary machine that would otherwise generate vibration in said support, wherein the system load is secured to the support solely by means of a plurality of devices of the invention.

BRIEF DESCRIPTION OF THE DRAWINGS

The invention will be better understood from the following description and the accompanying drawings, in which.

MORE DETAILED DESCRIPTION

In FIGS. 1 to 6, the same references are used to designate the same elements.

Figure 1:
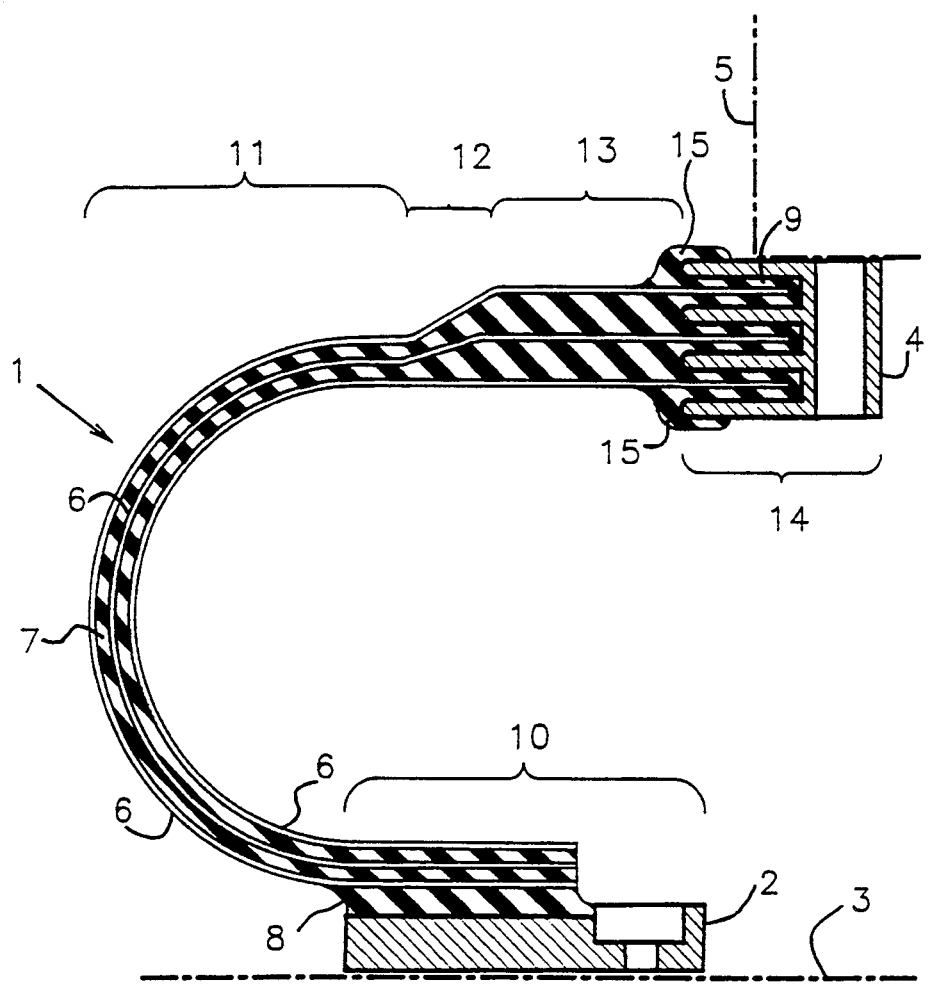
FIG. 1 is a section view through a first embodiment of a vibration-filtering device of the present invention.
Figure 2:
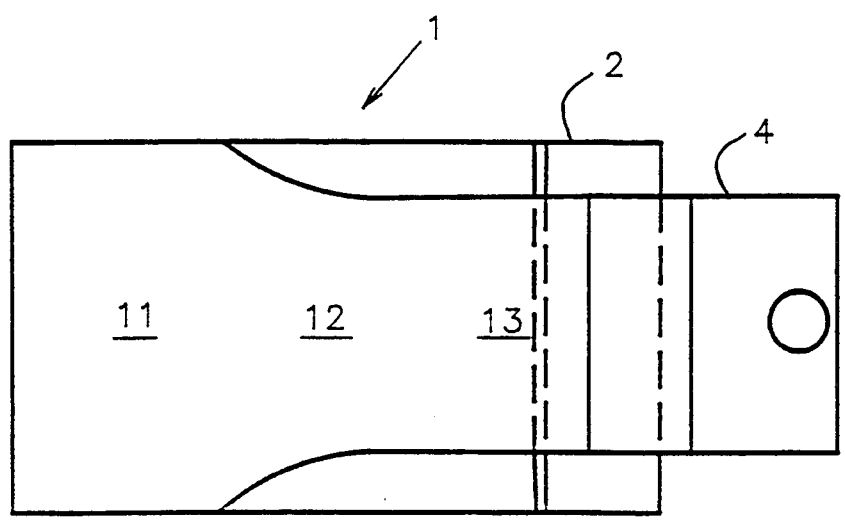
FIG. 2 is a plan view of a second embodiment of a vibration-filtering device of the present invention.
Figure 3:
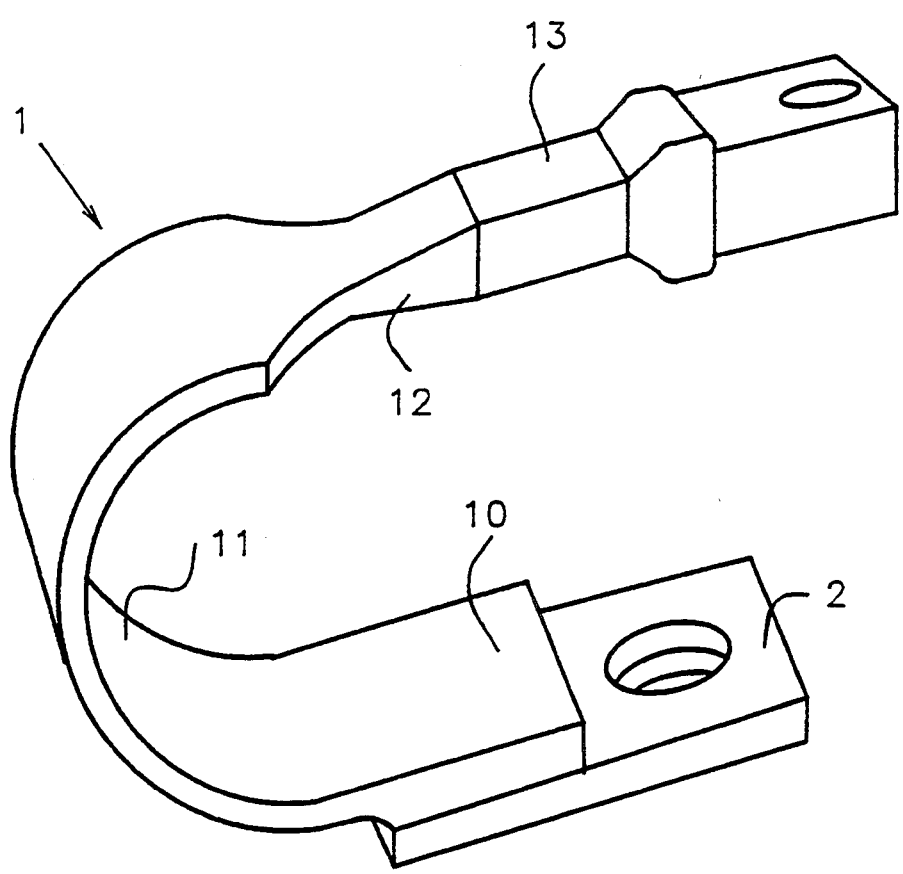
FIG. 3 is a perspective of a third embodiment of a vibration-filtering device of the present invention.

In FIGS. 1 to 3, there can be seen three embodiments of a vibration-filtering device 1 of the invention, each designed for supporting a different load. As explained below, the device of FIG. 3 is designed for a light load, the device of FIG. 1 for a medium-sized load, and the device of FIG. 2 is designed to support a heavy load.

The vibration-filtering device 1 of the invention is generally C-shaped, having its ends fixed to means 2 for fastening to a support 3 and to means 4 for fastening to a load 5 to be supported, in particular metal means including openings for receiving respective bolts. At least two substantially parallel spring blades 6 interconnected by an elastomer layer 7 extend between the fastening means 2 and 4 without being secured directly to the fastening means. It is possible to use a stack of springs 6 interconnected by elastomer layers 7. For example, the vibration-filtering device of FIG. 1 comprises three springs interconnected by two elastomer layers, the device of FIG. 2 comprises four springs interconnected by three elastomer layers, whereas the device of FIG. 3 comprises two springs interconnected by one elastomer layer. These spring blades advantageously extend over the entire width of the device of the invention, and they are kept separate from the fastening means 2 and 4 by respective elastomer layers 8 and 9. The elastomer matrix provides cohesion to the vibration-filtering device of the invention. It serves simultaneously to provide connection without direct contact between the various springs 6 and also between the springs 6 and the fastening means 2 and 4.

The vibration-filtering device of the invention comprises, in succession, a zone 10 for fastening on the support 3, an arcuate zone 11, a transition zone 12, a beam 13 substantially parallel to the fastening zone 10, and a fastening zone 14 for fastening to the load 5. Advantageously, the fastening zones 10 and/or 14 have large connection areas for connection to the fastening means 2 and/or 4. For example, the outer spring 6 may be connected to the fastening means 2 via an elastomer layer 8 that is substantially in the form of a rectangular parallelepiped. In the embodiment shown in FIG. 1, the ends of the spring 6 form a first comb, penetrating between the teeth of a comb formed by the ends of the fastening means 4. The interdigitated comb teeth are connected together by the elastomer layer 9. Advantageously, overmolding 15 overlies the first and last teeth of the comb formed by the ends of the fastening means 4.

The device of the invention may be adapted to the desired static and dynamic behavior.

Initially, the force that the load 5 is likely to apply is determined. This force depends on the mass of the load, on the acceleration to which it is subjected (acceleration to gravity, deceleration in the event of a shock, etc., . . .), end on the number of vibration-filtering devices used. For example, when all of the devices used are identical, the maximum force to be supported is divided by the number of devices. Each vibration-filtering device makes use of a set of springs 6 that together are of sufficient stiffness to support a determined force. For example, for large forces, the width of the springs 6 and the number of the springs 6 in the vibration-filtering device are increased.

Figure 6:
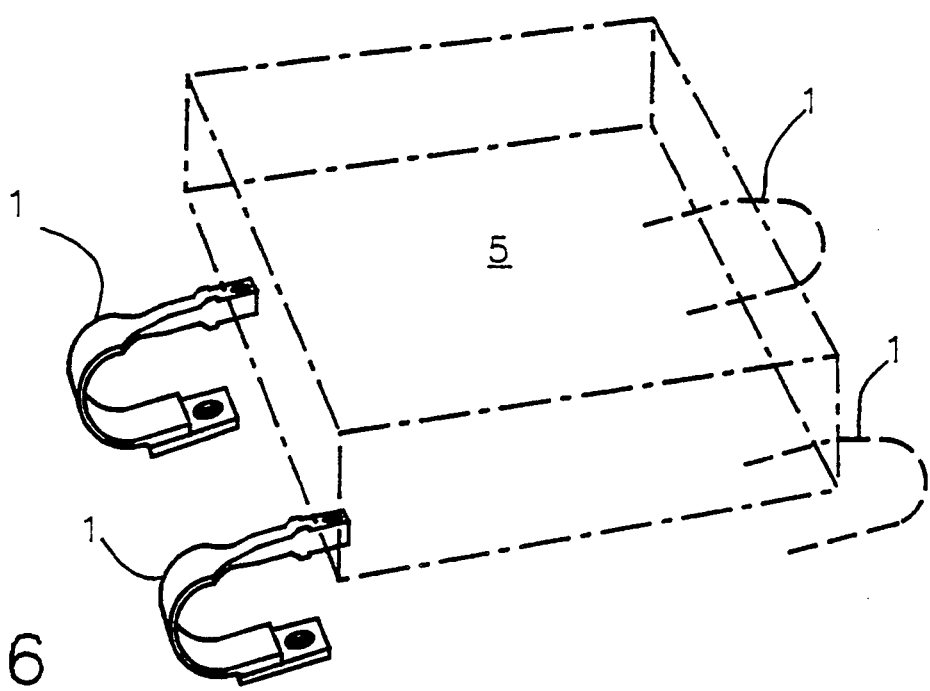
FIG. 6 is a highly diagrammatic perspective view of a system of the present invention for fixing an apparatus on a support.

In the example of FIG. 6, a loader 5 outlined in chain-dotted lines is supported by four vibration-filtering devices 1 of the invention (two of which are represented symbolically). Depending on circumstances, the load 5 may need to be protected from vibration, or on the contrary, it may generate vibration which is to be prevented from propagating into the support. The number and the positioning of the vibration-filtering devices 1 depends, most particularly, on the space available. In the example shown in FIG. 6, the four vibration-filtering devices are placed facing each other in pairs along two parallel sides of the supported load 1. However, the devices could be disposed in respective corners in line with the midplanes of a load that has a rectangular base, or they could be disposed solely beneath the base of the load 5, in such a manner that no portion of the vibration-filtering devices projects outside the base. Non-uniform distributions of the vibration-filtering devices relative to the bottom of the load 5 may turn out to be better at minimizing the appearance of resonant modes in the system that is constituted by the load 5 and a plurality of vibration-filtering devices, in particular when eliminating low frequency oscillations.

The invention is naturally not limited to a system in which the load is placed above a set of vibration-filtering devices. The load could be suspended from a plurality of vibration-filtering devices without going beyond the scope of the present invention.

Figure 4:
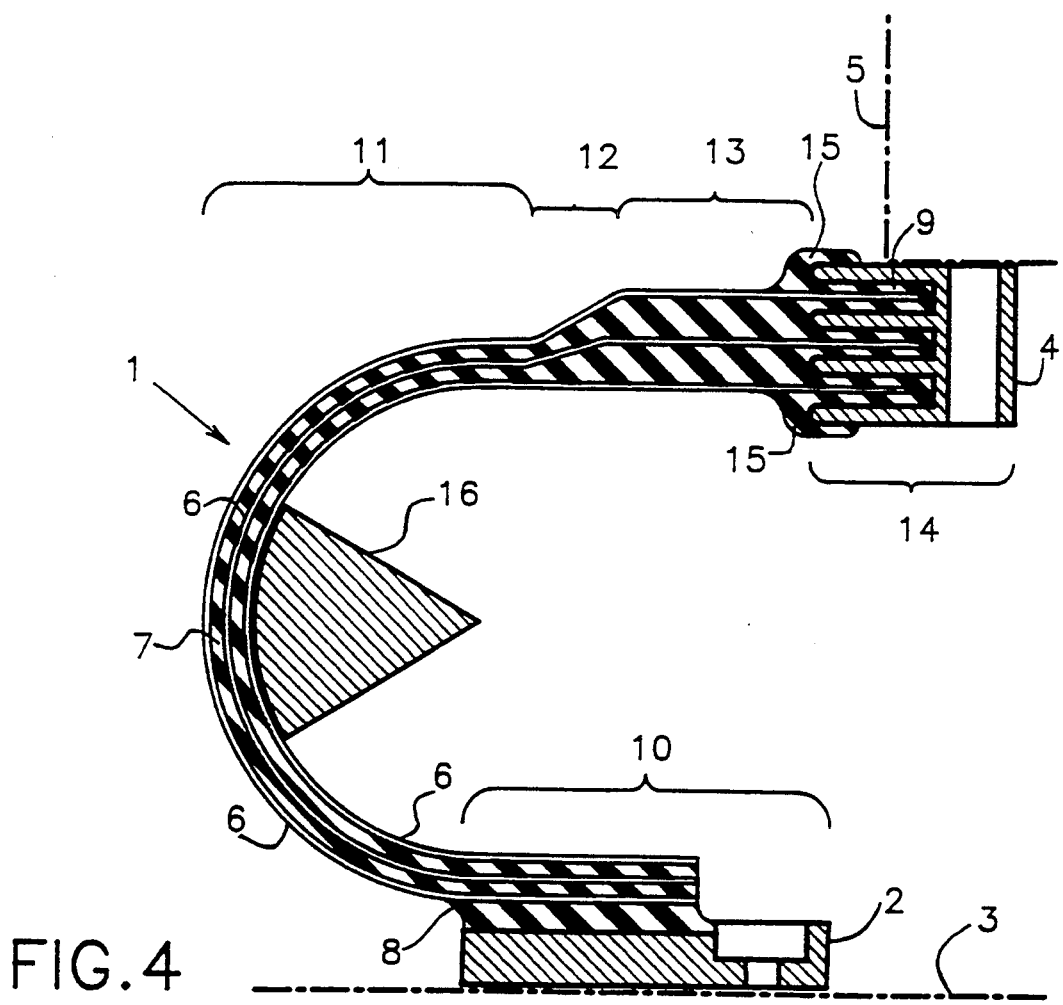
FIG. 4 is a section through a fourth embodiment of vibration-filtering device of the present invention.

Consideration is then taken of the vibration frequency band(s) to be eliminated. Vibration filtering is disturbed by the resonant modes of the vibration-filtering device that lie within the frequency band to be filtered. The mechanical characteristics of the vibration-filtering device of the invention, and in particular the mass/stiffness ratio of the springs 6, are determined in such a manner as to avoid or to minimize the appearance of undesirable resonant modes. For example, for filtering low and medium audio frequencies, it is advantageous to use spring blades 6 made of the glass fiber, carbon-fiber, or aramid-fiber type (e.g. the aramid sold under the trademark Kevlar by Du Pont de Nemours) with the fibers being embedded in an epoxy matrix. Similarly, it may be advantageous to secure a mass 16 to the midpoint of the arcuate zone 11 (as shown in FIG. 4), thereby altering the dynamic behavior of the vibration-filtering device of the invention. The mass which may be triangular in section, for example, is secured to the arcuate zone 11 by a layer of elastomer.

In addition, the static and dynamic behavior may be improved by implementing an arcuate zone 11 that is wide and thin, in contrast to a beam 13 which is narrow and thick. The transition zone 12 provides continuous variation in width and in thickness between the zone 11 and the beam 13, It is thus possible to adjust vertical stiffness and transverse stiffness independently. In the example shown, the lower spring 6 in the transition zone 12 is substantially parallel to the zone 10, the next spring 6 moving progressively further from the lower spring 6 on passing from the arcuate zone 11 to the beam 13 where all of the springs are parallel.

Finally, a choice is made for the material(s), in particular elastomer material, for implementing the layers 7 that interconnect the spring blades 6. These materials are required to work in shear during relative displacement of two springs 6 in order to absorb vibration.

Figure 5:
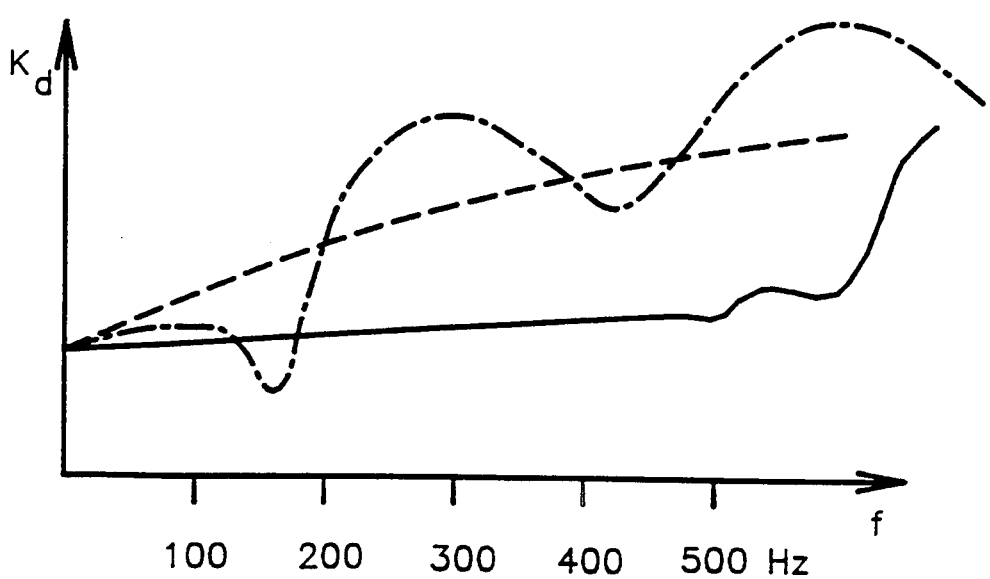
FIG. 5 is a graph showing how the properties of a filtering device of the present invention vary depending on the type of elastomer used.

FIG. 5 is a graph with stiffness $K_d$ (in N/mm) plotted as a function of frequency f (in Hz), for three embodiments of vibration-filtering devices of the invention.

The dashed line shows the stiffness of a vibration-filtering device whose layers 7 interconnecting the springs 6 are made of an elastomer having a high damping coefficient, e.g. butyl rubber. The stiffness of this embodiment increases uniformly with frequency, thereby degrading its performance at medium and high frequencies.

The chain-dotted line represents the stiffness of a vibration-filtering device whose layers 7 interconnecting the springs 6 are made of an elastomer having a low damping coefficient, e.g. natural rubber. The stiffness of this embodiment is substantially constant for a range of frequencies going from static to 150 Hz, but it presents a first resonance between 200 Hz and 300 Hz, followed by other resonances at higher frequencies, thereby limiting use of this embodiment to filtering frequencies of less than 150 Hz.

The solid line shows a preferred embodiment of the vibration-filtering device where the layers 7 interconnecting the springs 6 in the arcuate zone 11 are made of an elastomer having a high damping coefficient, whereas, in contrast, the layers 7 in the beam 13 are made of natural rubber that has a low damping coefficient. This embodiment serves to filter vibrations over a wide range of frequencies.

Naturally, a vibration-filtering device that also provides protection against shock does not go beyond the scope of the present invention.

The invention is mainly applicable to confining noise end/or vibration, in particular the noise and vibration generated by rotary machinery.

We claim:

1. A vibration-filtering device adapted for fixing a load on a support, the device comprising in succession:
   a first fastening zone including fastening means for fastening the device to a support;
   an arcuate zone;
   a beam substantially parallel to the first fastening zone;
   a second fastening zone including fastening means for fastening a load to the device; and
   at least two spring blades interconnected by an elastomer layer;
   the spring blades and the interconnecting elastomer layer passing through the beam to terminate in the second fastening zone close to the fastening means but being separated therefrom by respective elastomer layers;
   the spring blades also being separated from one another in the first fastening zone by an elastomer layer; and
   the elastomer layer interconnecting the spring blades having a high damping coefficient in the arcuate zone.

2. A device according to claim 1, wherein the spring blades are composite material springs.

3. A device according to claim 1, wherein the layer interconnecting the spring blades includes an elastomer having a low damping coefficient, in particular natural rubber, in particular in the beam.

4. A device according to claim 1, including a transition zone between the arcuate zone and the beam, the thickness of the beam being greater than the thickness of the arcuate zone of the device.

5. A device according to claim 1, including a transition zone between the arcuate zone and the beam which is narrower than the arcuate zone of the device.

6. A device according to claim 1, including a mass fixed substantially halfway along the arcuate zone to modify the dynamic behavior of the device.

7. A device according to claim 1, including at least three spring blades interconnected in pairs by elastomer layers.

8. A device according to claim 1, wherein the elastomer layer in tim first fastening zone and interconnecting the springs and the fastening means is substantially in the form of a rectangular parallelepiped.

9. A device according to claim 1, wherein the fastening means for fastening a load to the device comprise a comb having the ends of the spring blades penetrating between the teeth of the comb.

10. A device according to claim 9, wherein the second fastening zone includes elastomer overmolding on the first and last teeth of the comb formed by the ends of the fastening means.

11. A device according to claim 1, that is generally C-shaped.

12. A system for fastening a load on a support, and in particular for fastening a rotary machine that would otherwise generate vibration in said support, wherein the system load is secured to the support solely by means of a plurality of devices according to claim 1.

13. A device according to claim 1, wherein the elastomer layer comprises butyl rubber.

* * * * *

UNITED STATES PATENT AND TRADEMARK OFFICE
CERTIFICATE OF CORRECTION

PATENT NO. : 5,358,210
DATED      : October 25, 1994
INVENTOR(S) : Jean-Michel Simon et al.

It is certified that error appears in the above-identified patent and that said Letters Patent is hereby corrected as shown below:

Column 1, line 9, "lead" should be -- load --.

Column 4, line 25, "end" should be -- and --.

Column 5, line 19, after "13" the comma "," should be a period -- . --.

Column 5, line 63, "end" should be -- and --.

Column 6, line 44, "tim" should be -- the --.

Signed and Sealed this

Thirty-first Day of January, 1995

Attest:

BRUCE LEHMAN

Attesting Officer        Commissioner of Patents and Trademarks